United States Patent [19]

Budnik

[11] Patent Number: 6,109,701
[45] Date of Patent: Aug. 29, 2000

[54] VEHICLE WHEEL

[76] Inventor: Alan Budnik, 17951 Whitford La., Huntington Beach, Calif. 92649

[21] Appl. No.: 09/144,901

[22] Filed: Sep. 1, 1998

Related U.S. Application Data

[63] Continuation-in-part of application No. 29/072,273, Jun. 4, 1997, abandoned, which is a continuation-in-part of application No. 29/059,746, Sep. 30, 1996, abandoned.

[51] Int. Cl.[7] ........................................................ B60B 3/10
[52] U.S. Cl. ............................................ 301/64.1; D12/209
[58] Field of Search .................................. 301/63.1, 64.1, 301/65; D12/204, 209, 211

[56] References Cited

U.S. PATENT DOCUMENTS

| | | | |
|---|---|---|---|
| D. 302,146 | 7/1989 | Black | D12/211 |
| D. 322,421 | 12/1991 | Shinoda | D12/209 |
| D. 325,018 | 3/1992 | Nordmann | D12/209 |
| D. 347,203 | 5/1994 | Buyze et al. | D12/211 |
| D. 364,843 | 12/1995 | Hale, Jr. | D12/209 |

OTHER PUBLICATIONS

Boyds Wheels Catalog, 1995.
Colorado Custom FC Catalog, 1995.
Ultra Custom Wheels Catalog, 1997.
Budnik Wheels Style Guide, Premier Issue, 1993.
Budnik Wheels Style Guide, vol. II, 1994.
Weld Racing 1995 Style Guide Brochure.
Ultra Custom Wheels Catalog, 1995.

*Primary Examiner*—Russell D. Stormer
*Attorney, Agent, or Firm*—Price Gess & Ubell

[57] ABSTRACT

A vehicle wheel having a circular rim, a central hub having a circular perimeter, and a spoke structure positioned between the hub and the rim, the spoke structure comprising three pairs of spokes, the spokes being contoured to define alternating teardrop-shaped and crown-shaped openings between them. First, second and third spikes extend radially into a respective one of the crown-shaped openings.

9 Claims, 3 Drawing Sheets

VEHICLE WHEEL

This application is a continuation-in-part of U.S. patent application Ser. No. 29/072,273, filed Jun. 4, 1997 now abandoned, which application is a continuation-in-part of abandoned U.S. patent application Ser. No. 29/059,746, filed on Sep. 30, 1996, now abandoned.

BACKGROUND OF THE INVENTION

1. Field of the Invention

The subject invention relates to an article of manufacture and more particularly to a vehicle wheel.

2. Description of Related Art

Various vehicle wheel structures are known in the prior art, which are of the so-called "after market" type directed to enthusiasts who seek to customize or dress-up their vehicles. The present invention relates to such a wheel having superior properties for such purposes.

SUMMARY OF THE INVENTION

The vehicle wheel of the invention may be characterized as having a circular rim, a central hub having a circular perimeter and a spoke structure positioned between the hub and the rim, the spoke structure comprising three pairs of spokes, a first spoke of each pair joining a second spoke of the pair at a point spaced apart from the hub with respective opposing sides of the first and second spokes being contoured to define a teardrop-shaped opening between the first and second spokes. The first spoke of one pair is further separated from the second spoke of an adjacent pair by an arcuate portion of the perimeter of the hub and has a concavely curved side edge disposed opposite a concavely curved side edge of the spoke of the adjacent pair so as to define a crown-shaped opening therebetween. First, second and third spikes each having a base located at the center of one of the arcuate portions extend radially into a respective one of the crown-shaped openings.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein.

DETAILED DESCRIPTION OF THE PREFERRED EMBODIMENTS

Figure 3:
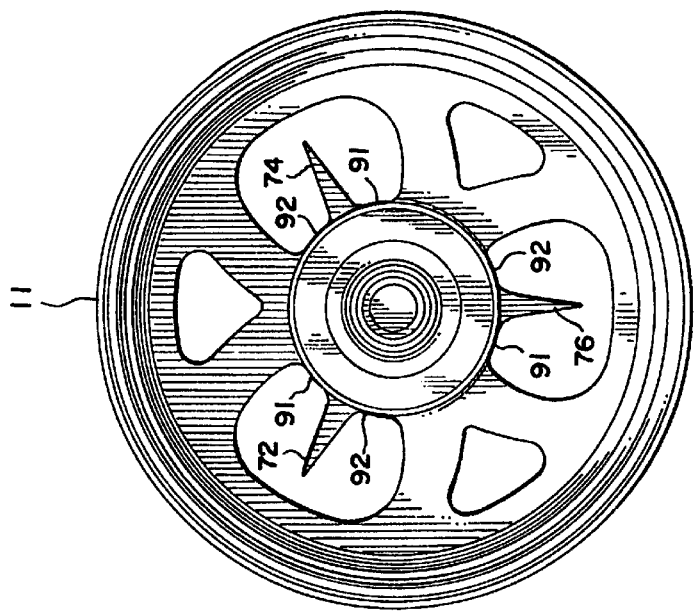
FIG. 3 is a rear view.
Figure 2:
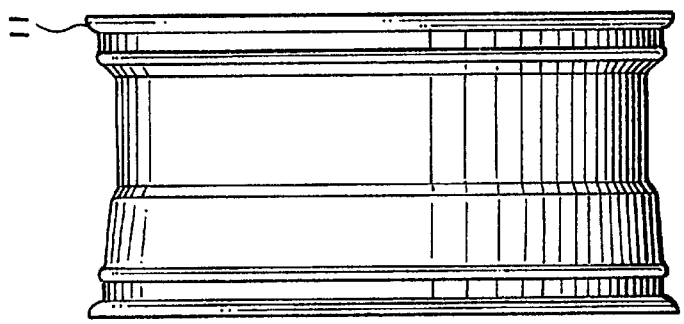
FIG. 2 is a side view.
Figure 1:
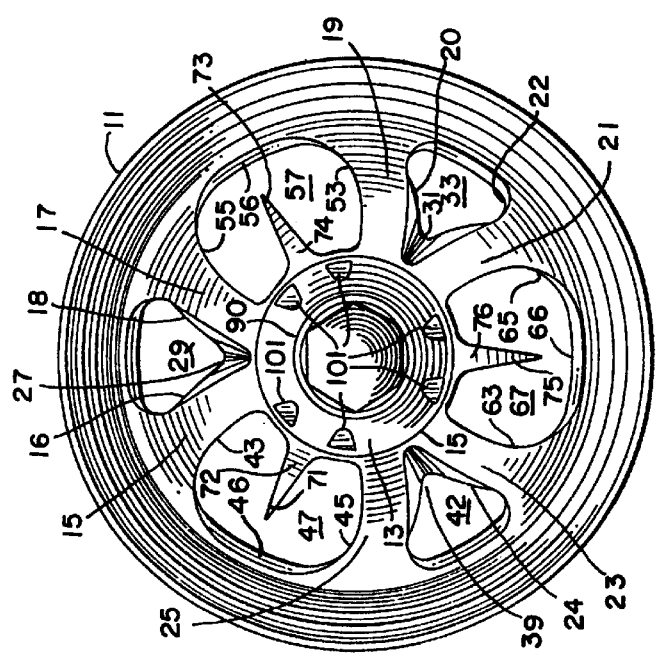
FIG. 1 is a front view of the vehicle wheel of the present invention.
Figure 5:
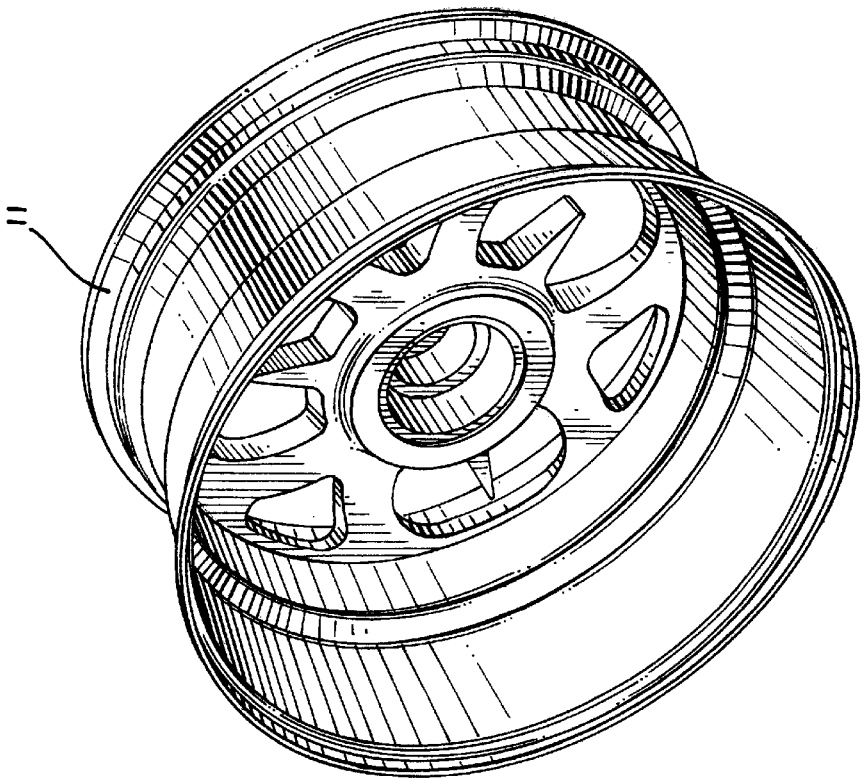
FIG. 5 is a perspective rear view of a vehicle wheel according to the preferred embodiment.
Figure 4:
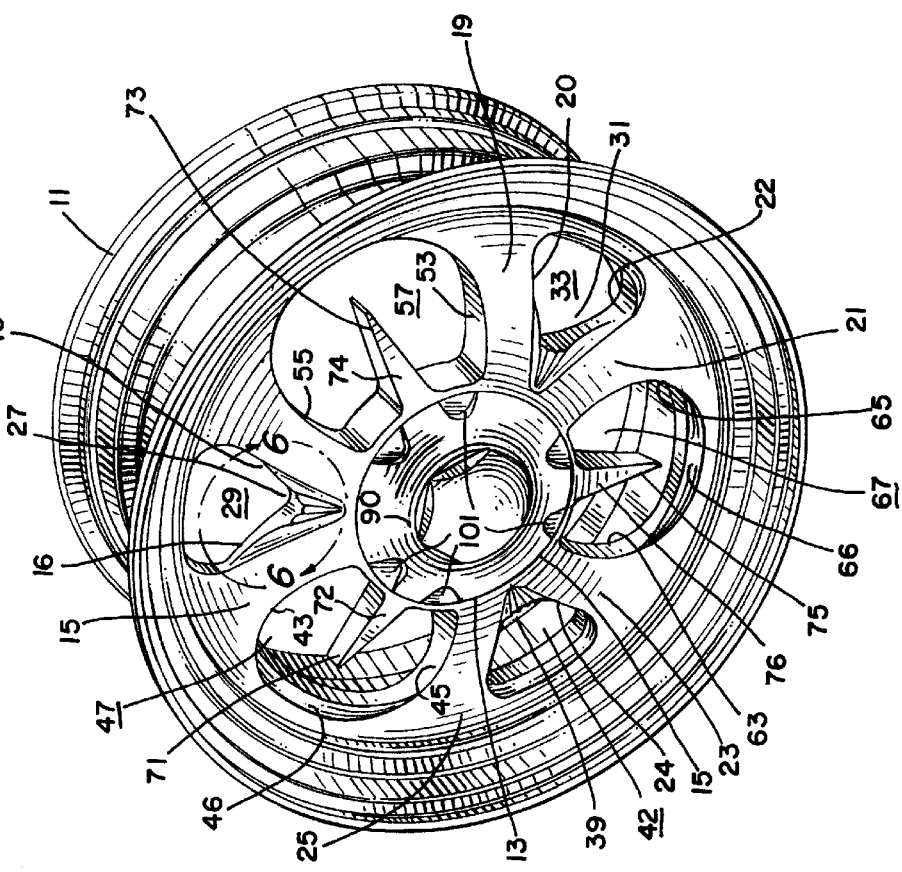
FIG. 4 is a front perspective view of a vehicle wheel according to the preferred embodiment.
Figure 6:
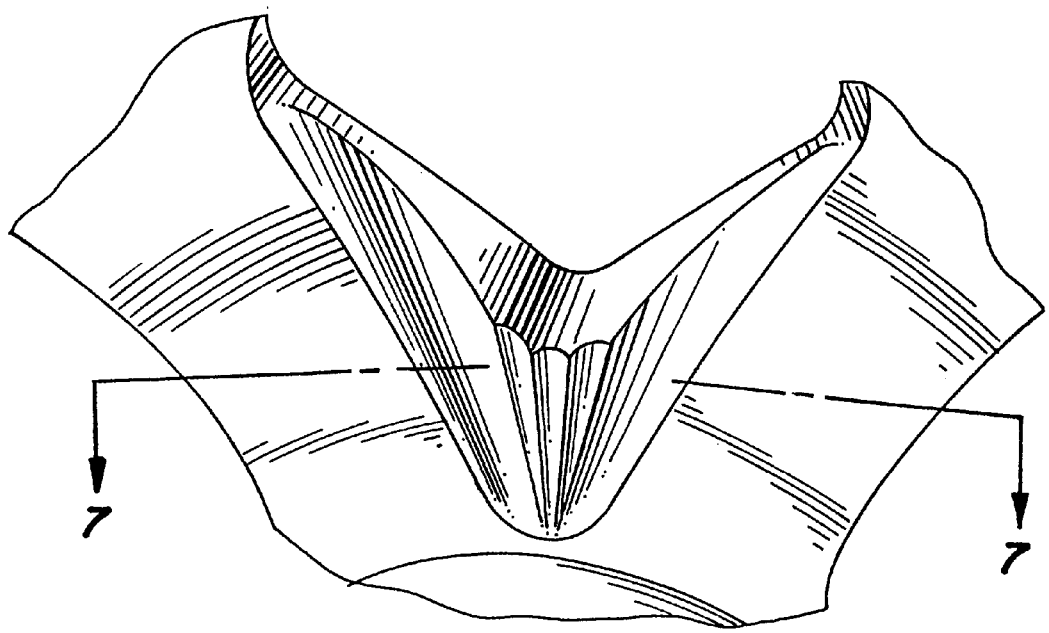
FIG. 6 is a fragmentary view of area 6—6 of FIG. 4.
Figure 7:
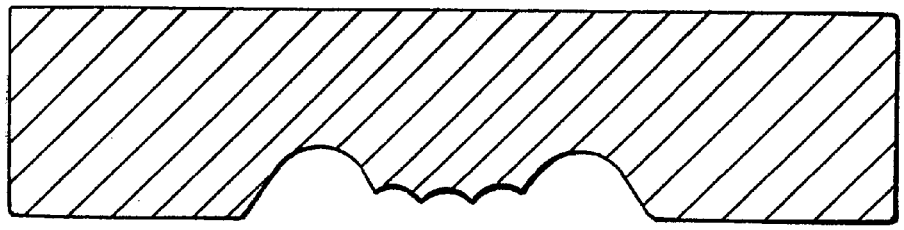
FIG. 7 is a cross sectional view taken at 7—7 of FIG. 6.

A vehicle wheel according to the preferred embodiment is shown in FIGS. 1–3. The wheel includes a circular rim 11 and a central hub 13 having a circular perimeter edge 15. A spoke structure is positioned between the hub 13 and the rim 11.

The spoke structure of the preferred embodiment comprises three pairs of spokes 15, 17; 19, 21; 23, 25. The first spoke 15 of the first pair joins the second spoke 17 of the first pair at a "v" junction point 27 which point 27 is spaced apart from the hub 13. Opposing sides 16, 18 of the first and second spokes 15, 17 are contoured to define a teardrop-shaped opening 29 between them. The first spoke 19 of the second pair similarly joins the second spoke 21 of the second pair at a "v" junction point 31 spaced apart from the hub 13. Opposing sides 20, 22 of the first and second spokes 19, 21 are again contoured to define a teardrop-shaped opening 33 between them. Finally, the first spoke 23 of the third spoke pair joins the second spoke 25 of the third spoke pair at a point 39 spaced apart from the hub 13. Opposing sides 24, 26 of the spokes 23, 25 of the third spoke pair are also contoured to define a teardrop-shaped opening 41 therebetween. It may be seen that each teardrop-shaped opening includes a "v"-shaped lower portion, each side of which terminates in oppositely disposed concave portions joined by a generally linear segment.

First, second and third spikes 71, 73, 75 are further provided each having a respective base 72, 74, 76 located adjacent the circular edge 13. Each spoke extends radially into the middle of a respective one of three crowned-shaped openings 47, 57, 67. Arcuate edge segments 91, 92 extend on either side the respective spokes to meet respective concavely curved side edges of the crowned-shaped openings. The edge segments 91, 92 thereby define the floor of the respective crown-shaped openings 47, 57, 67.

The first spoke 15 of the first spoke pair has a concavely curved side edge 43 disposed opposite a concavely curved side edge 45 of the second spoke 25 of the third spoke pair, the concaved portions 43, 45 being joined by a generally linear outer segment 46 so as to define a crown-shaped opening 43 therebetween. The first spoke 19 of the second pair has a concavely curved side edge 53 disposed opposite a concavely curved side edge 55 of the second spoke 17, the concave edges 53, 55 being joined by a generally linear outer segment 56 so as to define a crown-shaped opening 57. The first spoke 23 of the third pair has a concavely curved side edge 63 disposed opposite a concavely curved side edge 65 of the second spoke 21, the concave edges 53, 55 being joined by a generally linear outer segment 66, so as to define a crown-shaped opening 67. Thus, the preferred wheel includes three substantially identical teardrop-shaped openings 29, 33 and three substantially identical crowned-shaped openings 47, 57, 67, all lying within the rim 11 and alternately positioned with respect to one another around the hub 13.

Beneath each teardrop-shaped opening 29, 33, 42, v-shaped areas 81, 83, 85 are provided each having a plurality of edges which fan in to converge toward a single point. The hub 13 further has a conically tapered portion, such that the hub portion is wider at edge 13 and narrows as it extends outwardly toward circular edge 90. The conically tapered portion exhibits a smooth, unbroken surface with the exception of three pairs of first and second depressions 101, 102 formed therein, the first depression 101 of each pair lying to the right side of the base of a respective one the spikes 71, 72, 73, the second depression 102 of each pair lying to the left side of the base of a respective one of the spikes 71, 72, 73. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A vehicle wheel comprising:

a circular rim;

a central hub having a circular perimeter;

a spoke structure positioned between said hub and said rim, said spoke structure comprising three pairs of spokes, a first spoke of each pair joining a second spoke of the pair at a point spaced apart from said hub with respective opposing sides of said first and second spokes being contoured to define a teardrop shaped opening between the first and second spokes, the first spoke of one pair being separated from the second spoke of an adjacent pair by an arcuate portion of the perimeter of said hub, said spoke of one pair having a concavely curved side edge disposed opposite a concavely curved side edge of a said second spoke of an adjacent pair, the oppositely disposed side edges having a generally linear outer edge portion therebetween so as to define a crown-shaped opening, whereby said wheel includes three teardrop-shaped openings and three crowned-shaped openings lying within said rim and alternately positioned with respect to one another around said hub; and first, second and third spikes each having a base located at the center of one of said arcuate portions and extending radially into a respective one of said crowned-shaped openings.

2. The vehicle wheel of claim 1 further including a v-shaped area beneath each teardrop-shaped opening, said v-shaped area including a plurality of edges fanning in toward said hub.

3. The vehicle wheel of claim 1 wherein said hub includes a conically tapered portion.

4. The vehicle wheel of claim 1 wherein said conically tapered portion has three pairs of first and second depressions formed therein, one of the first depressions of each pair lying to the right side of the base of a respective one said spikes, one of the second depression of each pair lying to the left side of the base of a respective one of said spikes.

5. The vehicle wheel of claim 3 further including a v-shaped area beneath each said teardrop-shaped opening, each v-shaped area including a plurality of edges fanning in toward said hub.

6. The vehicle wheel of claim 1 wherein each said spoke curves concavely from said hub outwardly to meet said rim.

7. The vehicle wheel of claim 2 wherein each said spoke curves concavely from said hub outwardly to meet said rim.

8. The vehicle wheel of claim 3 wherein each said spoke curves concavely from said hub outwardly to meet said rim.

9. The vehicle wheel of claim 4 wherein each said spoke curves concavely from said hub outwardly to meet said rim.

* * * * *